United States Patent [19]

McGilvery et al.

[11] 4,152,403
[45] May 1, 1979

[54] PRODUCTION OF RED PHOSPHORUS

[75] Inventors: James D. McGilvery, Etobicoke; Vicram P. Singh, Scarborough, both of Canada

[73] Assignee: ERCO Industries Limited, Islington, Canada

[21] Appl. No.: 872,096

[22] Filed: Jan. 25, 1978

Related U.S. Application Data

[63] Continuation-in-part of Ser. No. 735,842, Oct. 26, 1976, abandoned.

[51] Int. Cl.² .......................................... C01B 25/023
[52] U.S. Cl. .................................................... 423/322
[58] Field of Search ......................................... 423/322

[56] References Cited

U.S. PATENT DOCUMENTS

| 804,555 | 11/1905 | Schenck et al. | 23/322 |
|---|---|---|---|
| 2,397,951 | 4/1946 | DeWitt | 423/322 |
| 2,476,335 | 7/1949 | Tusson | 423/322 |
| 3,056,660 | 10/1962 | Williams | 423/322 |
| 3,207,583 | 9/1965 | Brautigam et al. | 423/322 |
| 3,840,623 | 10/1974 | Olsson et al. | 264/13 |
| 3,998,931 | 12/1976 | Hyman et al. | 423/322 |

FOREIGN PATENT DOCUMENTS

| 247905 | 4/1911 | Fed. Rep. of Germany | 423/322 |
|---|---|---|---|
| 135473 | 5/1960 | U.S.S.R. | 423/322 |

OTHER PUBLICATIONS

VanWazer, Phosphorus and Its Compounds, 1958, pp. 101, 102, 112–118.
Kirk–Othmer, Encyclopedia of Chem. Tech., 1969, pp. 276–286.

Primary Examiner—O. R. Vertiz
Assistant Examiner—Thomas W. Roy
Attorney, Agent, or Firm—Sim & McBurney

[57] ABSTRACT

Red phosphorus, usually in amorphous form, is obtained by heating liquid white phosphorus at a temperature of between 250° and 590° C. while the phosphorus is subjected to a pressure greater than the theoretical vapor pressure of white phosphorus at the heating temperature. The application of such pressure minimizes phosphorus vapor formation during the conversion to red phosphorus. The process may be carried out by feeding liquid white phosphorus into an extrusion head heated to the reaction temperature while subjecting the white phosphorus to the appropriate pressure in the extrusion head, the red phosphorus being extruded from the extrusion head into an inert atmosphere. Alternatively, molten white phosphorus in droplet form may be pumped into an inert immiscible heat exchange fluid, such as, lead, at the reaction temperature, the appropriate pressure applied in the fluid and particulate red phosphorus separated from the fluid.

10 Claims, 3 Drawing Figures

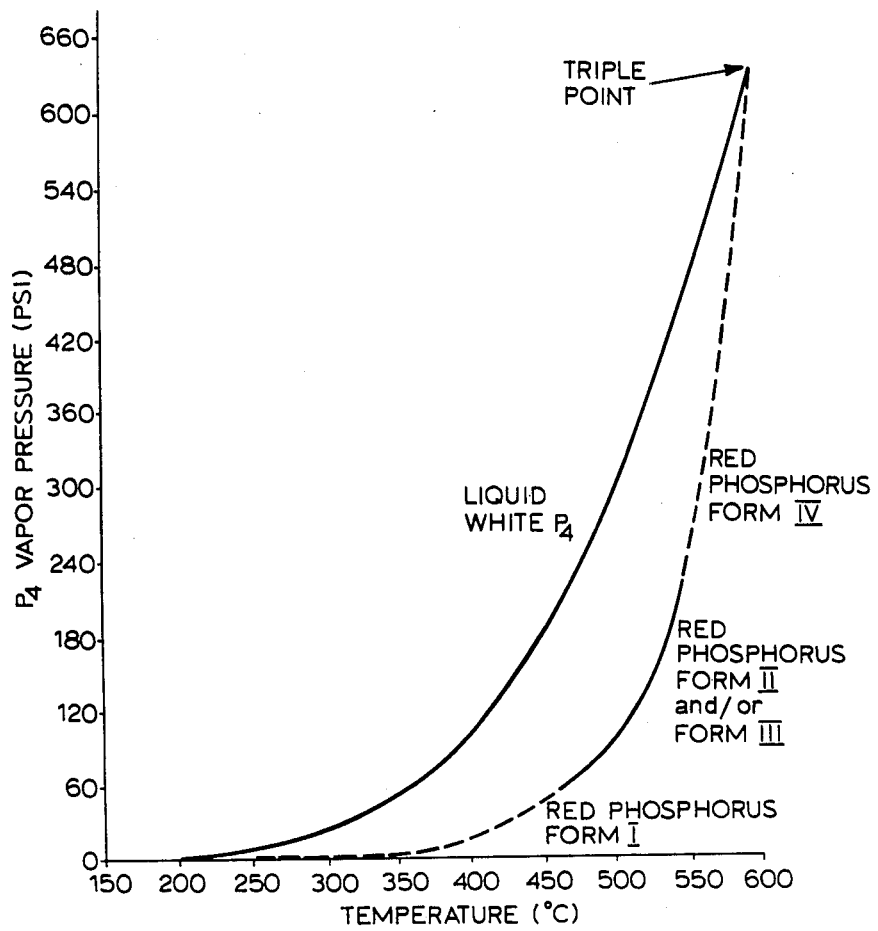

PRODUCTION OF RED PHOSPHORUS

REFERENCE TO RELATED APPLICATION

The present application is a continuation-in-part of our copending application Ser. No. 735,842 filed Oct. 26, 1976 (now abandoned).

FIELD OF INVENTION

This invention relates to the production of red phosphorus.

BACKGROUND TO THE INVENTION

Red phosphorus in mainly amorphous form may be prepared in a batch procedure by heating white phosphorus in a substantially inert atmosphere above the temperature at which white phosphorus converts to the red form at a practical rate, typically to about 250° C. This procedure has many drawbacks, typically of an environmental nature arising from incomplete conversion of white phosphorus to red phosphorus. Thus, toxic phosphorus fumes may be emitted on opening the reactor, removal of the residual white phosphorus, typically by addition of soda ash followed by leaching produces a phosphate solution requiring disposal, and the disintegration of the red phosphorus product for removal from the reactor by chipping leads to dust formation and hazards to operators.

Attempts have been made to improve upon this prior art operation mainly centered around improving the degree of conversion of white to red phosphorus. Such attempts either have ended in failure or are extremely tedious to execute. One example is the process described in U.s. Pat. No. 3,207,583, wherein extensive heating times and elaborate temperature controls are required.

The prior art procedure just described does not employ any solvent for the phosphorus during the conversion step and no conversion catalysts are added. Procedures are known for the formation of red phosphorus from white phosphorus using such materials. For example, U.S. Pat. No. 804,555 and German Pat. No. 247,905 describe procedures wherein white phosphorus is dissolved in a solvent and red phosphorus is formed in and deposits from the solution phase in the presence of a conversion catalyst for the reaction.

In the prior art, it has also been suggested to form red phosphorus from white phosphorus on a continuous basis. U.S. Pat. No. 2,397,951 describes such a continuous procedure wherein white phosphorus is continuously fed into a converter heated to the desired conversion temperature and containing a substantially fixed volume of a fluid mixture of solid red phosphorus suspended in liquid white phosphorus, the fluid mixture is continuously removed from the converter, red phosphorus separated from liquid white phosphorus and unreacted white phosphorus recycled to the converter.

U.S. Pat. No. 3,998,931 describes an agitated reactor for effecting this continuous process while preventing the build up of red phosphorus solids in the reactor. The reaction is effected in the presence of an inert atmosphere in contact with the fluid mixture in the reactor.

SUMMARY OF THE INVENTION

The present invention is directed to the production of red phosphorus, usually in amorphous form, by thermal conversion of liquid white phosphorus and which is susceptible of continuous operation while substantially complete conversion is attained.

In accordance with the present invention, liquid white phosphorus is heated at a temperature of about 250° C. to about 590° C. while subjecting the white phosphorus to a pressure of about 10 to about 630 psi and above the theoretical vapor pressure of white phosphorus at the heating temperature. The process is carried out under conditions such that substantially no phosphorus vapor phase is formed.

GENERAL DESCRIPTION OF INVENTION

The process of the invention is characterized by a number of features which are unique and distinguish it from prior art operations. The heating of the white phosphorus is effected in the substantial absence of solvents and catalysts. The conversion of white to red phosphorus occurs in the liquid phase of molten white phosphorus from which solvents are absent and relies on the autocatalytic nature of the conversion process. The process thus is distinguished from the prior art solvent and catalyst based procedures referred to above.

During the conversion process, substantially no phosphorus vapor phase is permitted to form in this invention by subjecting the liquid white phosphorus to a pressure in excess of the theoretical vapor pressure of phosphorus at the reaction temperature. the term "substantially no phosphorus vapor phase" as used herein refers to preferably a complete absence of or at the most a very small vapor phase in contact with the liquid white phosphorus. This condition is preferably achieved in the invention by surrounding the liquid white phosphours by an enveloping material which contacts the liquid surface.

The literature contains several references to the vapor pressure of white phosphorus, for example, "Phosphorus and its Compounds" by J. R. Van Wazer, Interscience Publishers, Inc., 1958, pp 101 to 102. The graph shown on page 101 shows a broken line for vapor pressures of liquid phosphorus in the temperature range of 300° to 600° C. and it is indicated that the "liquid does not exist in the region represented by the broken line".

It is true that liquid phosphorus does not exist as a stable phase in this temperature region since liquid white phosphorus converts to solid red phosphorus in this temperature range but liquid white phosphurus does exist as a metastable phase during the time necessary for all the white phosphorus to convert to red phosphorus.

The rate of conversion of the liquid white phosphorus to red phosphorus is so rapid that the determination of the essentially transient vapor pressure over this temperature range is extremely difficult. Nevertheless, as the Van Wazer graph shows, there is a straight line correlation between the phosphorus vapor pressure and temperature up to 300° C. and beyond 600° C., so that the vapor pressure of liquid phosphorus in the intervening region can be extrapolated as a continuation of the straight line relationship, and this extrapolation is indicated by the broken line in the Van Wazer graph. The same interrelationship of vapor pressure and temperature as is shown in the Van Wazer graph is plotted in FIG. 3 of the accompanying drawings using a different scale.

The term "theoretical vapor pressure" as used herein refers to the vapor pressure of liquid phosphorus at the prevailing reaction temperature as determined from the Van Wazer graph or as determined from FIG. 3, and represents the vapor pressure that can actually be measured or that is determined by extrapolation, depending on the particular temperature involved.

It is an important feature of this invention, and one which distinguishes it from all prior art processes, that during the conversion process, the liquid white phosphorus is subjected to a pressure in excess of the theoretical vapor pressure of liquid phosphorus. The vapor phase in contact with the liquid phosphorus is minimized and preferably is eliminated entirely.

This procedure contrasts markedly with the prior art systems referred to above, wherein a gaseous atmosphere is provided, for example, in U.S. Pat. No. 3,998,931. This patent does refer to the use of pressures higher than atmospheric in order to maintain the white phosphorus liquid at temperatures higher than its atmospheric pressure boiling point (i.e. about 280° C.) so that the more rapid reaction rate at the higher temperatures may be utilized. However, a vapor phase nevertheless is present above the reaction mixture in the vessel and no attempt is made to minimize the vapor phase, as is the case in the present invention. The total pressure in the vessel in the case of the patent procedure is the same as the vapor pressure.

The white phosphorus is produced by heating liquid white phosphorus at a temperature of about 250° to about 590° C., preferably about 450° to about 550° C. The process is exothermic and after initial heating the heat of reaction maintains the reaction temperature. It may be necessary to remove some heat of reaction to prevent excessive heating and a runaway reaction.

The pressure applied exceeds the theoretical vapor pressure of liquid white phosphorus at the reaction temperature, typical of such pressure values are 180 psi at 450° C. and 465 psi at 550° C. The pressure may be applied to the liquid.

In one embodiment of the invention, a continuous operation may be provided and the appropriate pressure may be applied to the white phosphorus by pumping liquid white phosphorus into and through an extrusion head maintained at the desired reaction temperature, maintaining the liquid white phosphorus in the extrusion head long enough for the phosphorus to be wholly converted to red phosphorus and extruding the red phosphorus from the extrusion head, generally into an inert atmosphere.

The white phosphorus feed may be admixed with some recycled red phosphorus to absorb some of the heat of conversion generated in the reaction in the extrusion head.

Any suitable mechanical disintegration technique may be employed on the red phosphorus product, after suitable cooling of the product, if desired, to provide the red phosphorus in particulate form.

The minimum residence time of the phosphorus in the extrusion head in this embodiment is determined by the kinetics of the conversion reaction at the particular reaction temperature. For example, 99.9% conversion to red phosphorus is achieved in 0.1 minutes at 500° C. (see FIG. 2).

In another embodiment of the invention, the white phosphorus is pumped in liquid droplet form into a pressurized inert immiscible heat exchange fluid having the desired reaction temperature and which applies the required pressure to the phosphorus droplets during the conversion reaction. Following completion of the conversion to red phosphorus, the resultant particulate red phosphorus is separated from the fluid.

One example of a suitable heat exchange fluid for use in this embodiment of the invention is a bath of molten lead. Due to the exothermic nature of the conversion reaction, after an initial heating of the bath, cooling only may be necessary to maintain the desired reaction temperature.

Lead has a sufficiently low melting point, is inert to phosphorus and has an adequate heat conductivity that it serves as an admirable heat exchange fluid.

It has been suggested in U.S. Pat. No. 3,056,660 to use lead to purify phosphorus. In the procedure described in the patent, it is phosphorus vapor which contacts the lead and preferably by flowing the vapor over a molten bath of lead. The procedure involved in this prior patent, therefore, is quite different from that adopted in this embodiment wherein liquid white phosphorus is passed into a molten bath of lead to form solid particulate red phosphorus.

The temperatures used in the present invention are conducive to reaction of phosphorus with water and hence, it may be necessary to dehydrate the white phosphorus prior to exposing the white phosphorus to the reaction temperature. When such dehydration is desired, it may, for example, be achieved by heating the white phosphorus to a temperature slightly above 100° C. and sweeping the surface with an inert gas to remove the evaporated water.

BRIEF DESCRIPTION OF DRAWINGS

FIG. 3 is a graphical repesentation of the theoretical vapor pressure of phosphorus at various temperatures.

DESCRIPTION OF PREFERRED EMBODIMENT

Figure 1:
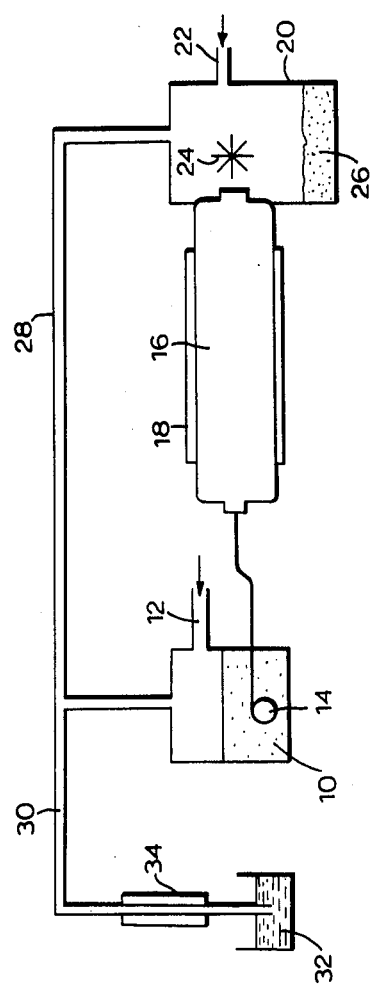
FIG. 1 is a schematic representation of one embodiment of the invention.

As seen in FIG. 1, white phosphorus having a temperature of above about 100° C. is situated in a container 10 through which an inert gas is passed through inlet 12. A submerged pump 14 pumps the white phosphorus into and through an extrusion head 16, having a heater jacket 18.

The extrusion head 16 preferably has a temperature of about 450° to 550° C. and extrudes the product red phosphorus into a cooling chamber 20, into which an inert gas is passed through inlet 22.

Figure 2:
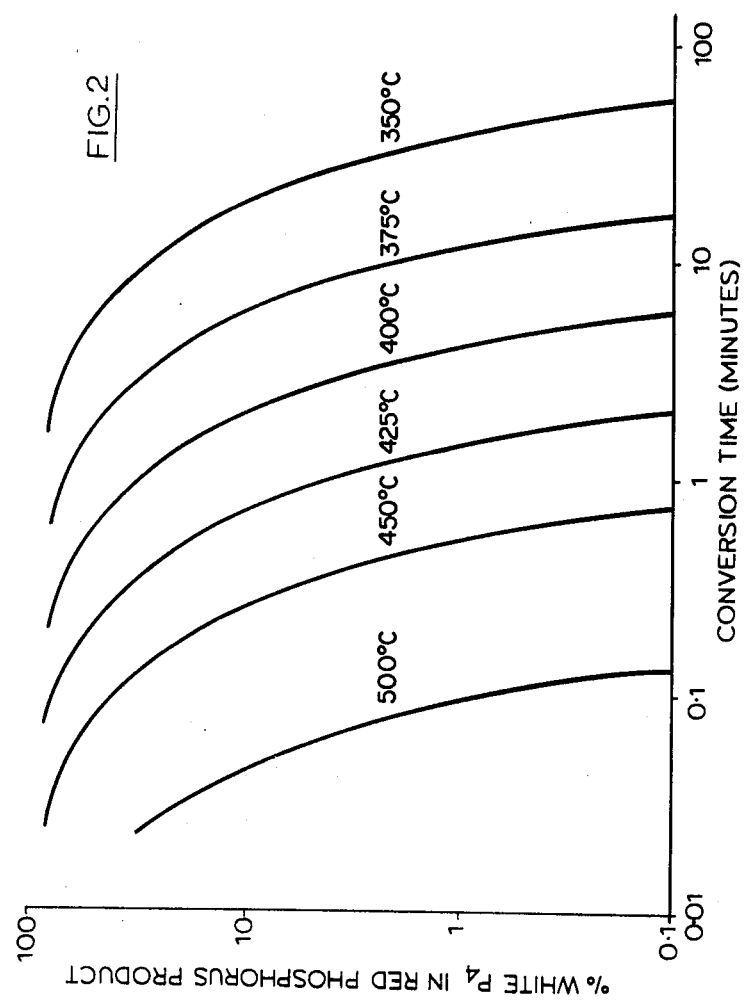
FIG. 2 is a graphical representation of the extent of conversion of white phosphorus to red phosphorus against time at various temperatures.

The pumping pressure and residence time in the extrusion head 16 are controlled first to minimize phosphorus vapor volume at the prevailing temperature, as determined from FIG. 3, and second to allow substantially complete conversion to red phosphorus as determined from FIG. 2.

A cutting head 24, or other mechanical disintegration means, is located in the cooling chamber 20 to break up or comminute the red phosphorus as it is extruded to provide an accumulation 26 of particulate product in the cooling chamber 20 for removal from time to time.

The gaseous materials from the container 10 and the cooling chamber 20 pass by pipes 28 and 30 into a water seal 32 which prevents the escape from the system of any phosphorus fumes which may be present in the gas streams. The gases are cooled by a condenser 34 prior to entry into the water seal 32.

It will be seen that this procedure is non-polluting since substantially complete conversion of white to red phosphorus is achieved and the escape of phosphorus fumes is avoided.

Further, continuous production of red phosphorus may be carried out with a minimum of labor requirements and in simple manner.

Additionally, by using filtered white phosphorus and stainless steel extrusion equipment, it is possible to prepare a red phosphorus product which is low in iron and copper, which traditionally have caused instability and firing of red phosphorus.

SUMMARY

The present invention, therefore, provides a simple and convenient non-polluting manner of forming red phosphorus by exothermic conversion of white phosphorus.

Modifications are possible within the scope of the invention.

What I claim is:

1. A process for the production of red phosphorus, which comprises:

heating liquid white phosphorus at a temperature of about 250° to about 590° C. in the absence of solvents for white phosphorus and phosphorus conversion catalysts;

confining said white phosphorus during said heating step such that no phosphorus vapor phase can form; and subjecting said white phosphorus to a pressure of about 10 to about 630 psi and above the theoretical vapor pressure of white phosphorus at the heating temperature during said heating step.

2. The process of claim 1 wherein said heating temperature is about 450° to about 550° C. at an applied pressure of about 180 to about 465 psi and above the theoretical vapor pressure of white phosphorus at the heating temperature.

3. A process for the continuous production of red phosphorus, which comprises:

feeding liquid white phosphorus into an extrusion head heated to a temperature of about 250° C. to about 590° C., conveying said liquid white phosphorus through said extrusion head while confined by internal parts of said extrusion head so that no phosphorus vapor phase can form, subjecting the liquid white phosphorus in the extrusion head in the absence of solvents for white phosphorus and phosphorus conversion catalysts to a pressure of about 10 to about 630 psi and exceeding the theoretical vapor pressure of white phosphorus at said reaction temperature, maintaining said liquid white phosphorus in said extrusion head for a period of time exceeding that required for substantially complete conversion of white phosphorus to red phosphorus at said reaction temperature, and extruding red phosphorus from said extrusion head.

4. The process of claim 3, including subdividing said red phosphorus as it is extruded from the extrusion head into an inert atmosphere.

5. The process of claim 3, including drying said white phosphorus before feeding the same to said extrusion head.

6. The process of claim 5 wherein said drying is carried out by heating the white phosphorus to a temperature above about 100° C. and sweeping an inert gas over the surface of the heated white phosphorus.

7. The process of claim 6, including extruding said red phosphorus into a cooled vessel through which an inert gas flows, removing inert gas from said cooled vessel, combining said removed inert gas with inert gas from said sweeping, and forwarding said combined stream through a water seal to scrub phosphorus therefrom.

8. The process of claim 3, including filtering said liquid white phosphorus prior to feeding the same into said extrusion head and using stainless steel as the material of construction of said extrusion head.

9. The process of claim 3, including mixing said liquid white phosphorus with recycled red phosphorus prior to feed to said extrusion head.

10. A process for the production of red phosphorus, which comprises:

feeding liquid white phosphorus in droplet form and in the absence of solvents for white phosphorus and phosphorus conversion catalysts into a molten bath of lead heated to a temperature of about 250° to about 590° C., subjecting said droplets of white phosphorus to a pressure of about 10 to about 630 psi and above the theoretical vapor pressure of white phosphorus at the reaction temperature under the surface of said molten lead bath, said molten lead bath surrounding and confining each of said liquid white phosphorus droplets so that no phosphorus vapor phase can be formed in said molten lead bath, maintaining said droplets in said molten lead bath at said reaction temperature for a period of time exceeding that required for substantially complete conversion of white phosphorus to red phosphorus, and separating the resulting particulate red phosphorus from said molten lead bath.

* * * * *